July 3, 1956  C. L. HAMM  2,753,473

SELF-CLEANING DYNAMOELECTRIC MACHINE

Filed July 1, 1953

Inventor:
Clarence L. Hamm,
by Claude A. Mott
His Attorney.

United States Patent Office 2,753,473
Patented July 3, 1956

2,753,473
SELF-CLEANING DYNAMOELECTRIC MACHINE

Clarence L. Hamm, Marblehead, Mass., assignor to General Electric Company, a corporation of New York Application July 1, 1953, Serial No. 365,323

2 Claims. (Cl. 310—60)

The present invention relates to dynamoelectric machines and more specifically to motors designed for operation in dust and lint laden atmospheres.

In many industrial applications, the air surrounding the driving motors is more or less filled with lint or dust which is light and easily carried about by air currents. Considerable trouble is experienced in the use of electric motors in such locations due to the clogging of air passages. The lint or dust are carried into the motor by the ventilating air and any sharp projections or other irregularities will catch such particles and once they have lodged at such points, additional particles carried into the machine by the ventilating air will be caught so that the build up of particles at these points is rapid and the resultant clogging of the air passages causes overheating of the motor. This is especially true with regard to the point of intersection of the rotor and the rotor shaft, a point of abrupt change in the direction of flow of ventilating air which causes the particles to separate out and begin to accumulate at this point. Once the accumulation of the particles begins, it rapidly builds up to impede the ventilation of the motor, necessitating the frequent cleaning of the motor. With many conventional designs of the motors this requires removal of the end brackets causing considerable difficulty and loss of time.

The object of this invention is to provide a dynamoelectric machine for use in such service which will be self-cleaning in that lint and dust particles carried into the machine by the ventilating air will pass on through and not lodge in the machine.

A further object of this invention is to provide a rotor construction which prevents particles carried by the air from accumulating at the intersection of the rotor and the rotor shaft or under the end rings, and the method of making the same.

The novel features which characterize this invention will be pointed out in the appended claims and the invention will be more readily understood from the following specification in which reference is made to the accompanying drawing.

Figure 1:
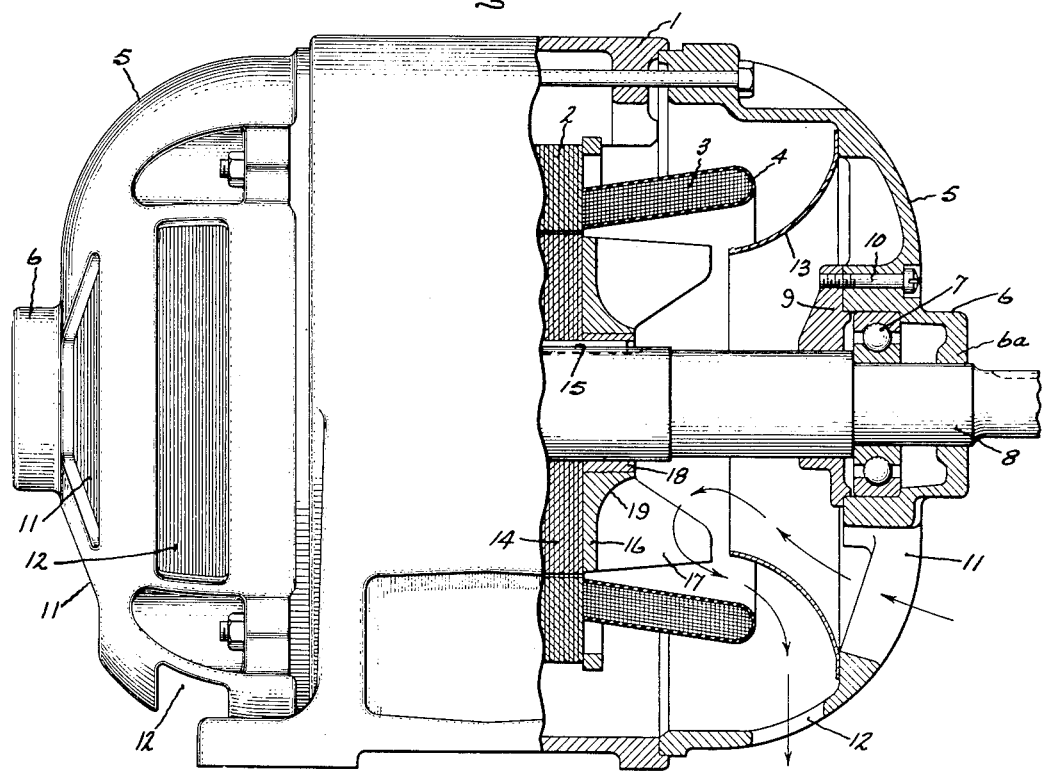
Fig. 1 is a side elevational view, partly in section, of a dynamoelectric machine embodying my invention. The sectional portion of Fig. 1 is along line 1—1 of Fig. 2.

In accordance with one aspect of this invention there is provided a ventilation arrangement wherein the air is drawn into each end of a motor through axial openings in each end shield by a fan cast integrally with each end ring of the rotor. The air passes outwardly from the same end of the motor past the stator windings, which may be skewed or tapered away from the air gap, and leaves the motor through radial openings in the motor end shield. An annular baffle separates the inlet and outlet paths of the cooling air. Since the cooling arrangements at both ends of the motor are identical the air does not pass through passages in the motor from one end to the other. The end rings are cast integrally with the rotor windings and the fan blades and extend radially from the outer periphery of the rotor substantially to the rotor shaft. The surface of the end ring presented to the air path is smooth and curved to prevent the attachment of particles to the rotor. The stator windings may, if desired, be covered with a smooth coating to provide a smooth air path past the stator windings.

As shown in the drawing, the motor has a stator frame member 1 with a stator core 2 secured thereto having windings 3 placed in slots therein (not shown). The stator core may be of any suitable construction but any radial or axial air ducts therein are preferably omitted. The end turns for winding 3 are preferably tapered or skewed away from the air gap so that their diameter at the ends thereof is greater than their diameter adjacent the stator core. In order to provide a smooth, unbroken projection-free surface for the stator windings, it is desirable to coat the winding end turns with a smooth, thin coating 4. Any suitable plastic or varnish coating may be used for this purpose.

Figure 2:
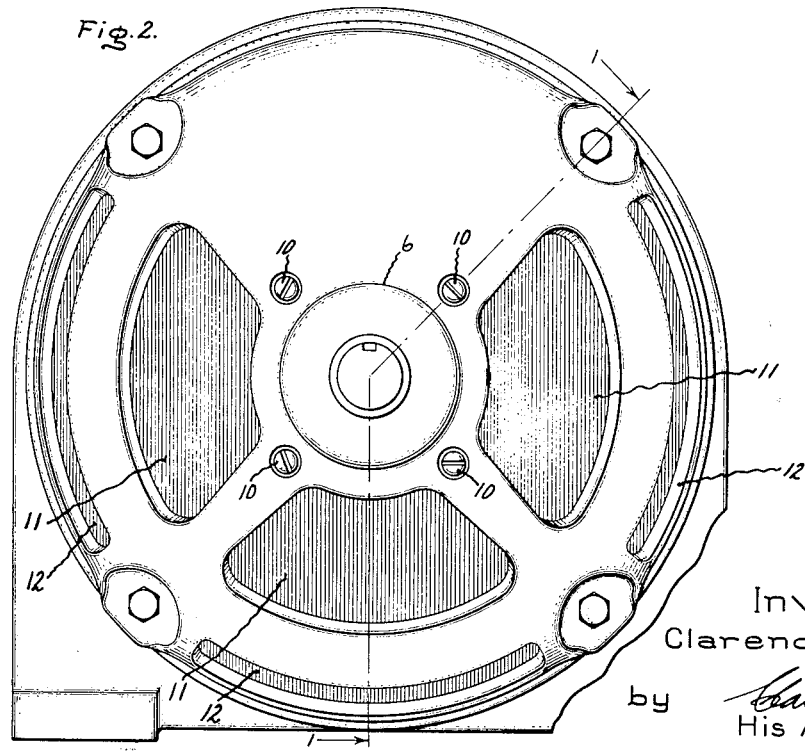
Fig. 2 is the end view of dynamoelectric machine embodying this invention.

To the ends of frame 1 are secured end members or end shields 5. The end shields 5 are each provided with a bearing housing 6 in which suitable bearings 7 for shaft 8 of the rotor are supported. An apertured annular collar 9 is secured by any suitable means, such as screws 10, to the inside of the end shield 5 surrounding shaft 8 to prevent the contamination of the bearings 7 by particles contained in the ventilating air. Centrally apertured radial flange portion 6a of bearing housing 6 provides a close running fit with shaft 8 to prevent the entry of particles carried by the surrounding air into the bearing cavity. Axial openings 11 are provided in the end shields to permit the entry of ventilating air. These openings are large and have smooth contours which do not contain projections extending into the path of the air where they would provide points of lodgment for particles carried by the air. An annular curved baffle 13 secured to end shield 5 provides an uninterrupted interior deflector which serves as a guide between the incoming and outgoing air. Radial openings 12 provided in end shields 5 serve as large unobstructed openings for the exhaust of air from the motor. The top quadrant of the motor is preferably completely closed, as best shown in Fig. 2, to prevent foreign matter from dropping into the motor.

The rotor core 14 is made of laminations of magnetic material which are keyed as at 15, or otherwise secured, to shaft 8. Rotor core 14 is provided with the usual winding slots (not shown) in which suitable non-magnetic conductors are cast.

The end ring construction which will now be described serves as an important part of this invention. End ring 16 is cast integrally with the rotor windings and with fan 17 having generally radially directed fan blades. Additionally, end ring 16 extends substantially from the outer periphery of the rotor laminations 14 to the rotor shaft 8 and presents an unbroken concave surface 19 to the air stream. This unitary cast end ring construction eliminates the usual sharp corner between the motor core and the rotor shaft as well as the pocket formed under the normal cast end ring. Thus the smooth concave deflecting surface 19 presented to the air stream by this construction prevents the accumulation of lint or dust particles on the rotor.

In casting this end ring construction, a steel collar 18 preferably having a knurled or grooved outer periphery and closely fitting the rotor core supporting arbor is preferably inserted in the mold around the arbor before the cast metal enters the mold. This eliminates the need for an annular lip of the mold extending to the rotor core adjacent the arbor and since collar 18 is molded in place and becomes a permanent part of the rotor, the space between the shaft and the end ring in the completed rotor is completely closed thereby eliminating any pocket in which particles can collect.

While the construction of one end of the motor has been described specifically, it is apparent that the opposite end of the motor could be likewise constructed to provide a parallel ventilation system.

In operation, air is drawn into the machine at each end of the machine by the action of fan 17 and enters through openings 11. The air passes by the stator windings 3 in a curved path as indicated by the arrows in Fig. 1 and escapes the machine through the openings 12 in the end shields. Particles carried by this air may be thrown, by centrifugal force, against the concave surface presented by the deep cast rotor end ring 19 but, because of the smooth contour of this surface, they are carried along this surface by the flow of the air. Since this surface is smooth and unbroken and there is no point of attachment for particles on the inner surface of the stator windings or on the bell-shaped baffle member 13 the air path through the motor provides no place that particles can lodge and the particles are therefore carried out of the machine by the air thus preventing clogging of the air passages.

From the foregoing, it is apparent that this motor construction provides a ventilation scheme wherein the air cooling the rotor and the stator has a very short air path within the motor housing and does not pass through openings in the rotor or stator to clog the motor. The large openings in the end shield plus the smooth contours of the surfaces defining the air path through the motor provide no projections to catch the particles in the air stream and results in a non-clogging self-cleaning construction.

It will be obvious to those skilled in the art that the construction which has been described is simple and efficient and that changes may be made in the form in which this invention is employed without departing from its spirit. It is to be understood therefore that the appended claims are intended to include all equivalent embodiments which come within their scope.

What I claim as new and desire to secure by Letters Patent of the United States is:

1. A dynamoelectric machine comprising a stator, a rotor, and an end shield, said stator comprising windings having end turns providing projection-free surfaces tapered outwardly away from said rotor, said rotor comprising end rings extending from the outer periphery thereof substantially to said shaft and presenting an outwardly turned concave surface, said end shield having a pair of openings for the entrance and exit of ventilating air, an annular curved uninterrupted baffle separating said openings, whereby said stator winding, said end ring and said baffle provide smooth deflecting surfaces in said ventilating passages against which any particles contained in the air entering the machine are carried by the air along these surfaces to the exterior of the motor.

2. In a self-cleaning open dynamoelectric machine for use in particle laden air, a shaft, a rotor mounted on said shaft, and a unitary cast squirrel cage induction winding for said rotor, the end rings of said squirrel cage winding extending radially inwardly at the ends of said rotor substantially to said shaft and presenting a smoothly curved concave outer contour to provide a large heat exchange surface on said end ring and to cause any particle carried by the ventilating air to be guided thereover without lodging.

References Cited in the file of this patent

UNITED STATES PATENTS

| 982,830 | Kingsbury | Jan. 31, 1911 |
| 1,011,944 | Gray | Dec. 19, 1911 |
| 1,137,510 | Mattman | Apr. 27, 1915 |
| 1,794,649 | Siler | Mar. 3, 1931 |
| 1,794,663 | Anderson | Mar. 3, 1931 |
| 2,200,126 | Smith | May 7, 1940 |
| 2,436,930 | Mackmann | Mar. 2, 1948 |

FOREIGN PATENTS

| 319,479 | Great Britain | Sept. 26, 1929 |
| 560,135 | Germany | Sept. 29, 1932 |
| 967,315 | France | Mar. 22, 1950 |
| 977,165 | France | Nov. 8, 1950 |